US010142278B2

(12) United States Patent
Garg et al.

(10) Patent No.: US 10,142,278 B2
(45) Date of Patent: Nov. 27, 2018

(54) AUTOMATIC ANOMALY ALERTS FOR SCHEDULED POSTS (71) Applicant: Adobe Systems Incorporated, San Jose, CA (US)

(72) Inventors: Mohit Garg, New Delhi (IN); Pawan Goyal, Uttar Pradesh (IN); Ankur Jain, Uttar Pradesh (IN); Vivek Kumar, Uttar Pradesh (IN)

(73) Assignee: Adobe Systems Incorporated, San Jose, CA (US)

( * ) Notice: Subject to any disclaimer, the term of this patent is extended or adjusted under 35 U.S.C. 154(b) by 606 days.

(21) Appl. No.: 14/514,072

(22) Filed: Oct. 14, 2014

(65) Prior Publication Data
US 2016/0104069 A1 Apr. 14, 2016

(51) Int. Cl.
*G06N 5/00* (2006.01)
*H04L 12/58* (2006.01)

(52) U.S. Cl.
CPC ............ *H04L 51/32* (2013.01); *G06N 5/00* (2013.01); *H04L 51/12* (2013.01)

(58) Field of Classification Search
CPC ...................................... G06N 5/00
USPC .......................................... 706/45
See application file for complete search history.

(56) References Cited

U.S. PATENT DOCUMENTS

2015/0332350 A1* 11/2015 Gauss ............... G06F 17/30244
705/14.72

OTHER PUBLICATIONS

Kawase et al (Who Wants to Get Fired? 2013).*
Kontopoulos et al ("Ontology-based sentiment analysis of twitter posts" 2013).*
Chandola, Varun, et al., "Anomaly Detection: A Survey," Aug. 15, 2007, 74 pages.

* cited by examiner

*Primary Examiner* — Lut Wong
(74) *Attorney, Agent, or Firm* — Finch & Maloney PLLC (57) ABSTRACT

Techniques are disclosed for automatically detecting anomalies in the content of a scheduled social media post, alerting a user to the presence of such anomalies before the content is posted and recommending a course of action when an anomaly is detected. A set of keywords is extracted from a scheduled post using an ontological classification technique. At predetermined time intervals, the keywords are compared with information obtained from one or more data sources to determine if an anomaly is present. If an anomaly is detected, the scheduled post is classified into one of at least three categories: supporting the post, neutral, or opposing the post. Once the anomaly is detected and the scheduled post is classified, the author of the post is alerted to the anomaly along with the categorization. Subsequently, the author may reschedule the post to an earlier or later time, delete the post, or change the post.

20 Claims, 5 Drawing Sheets

AUTOMATIC ANOMALY ALERTS FOR SCHEDULED POSTS

FIELD OF THE DISCLOSURE

This disclosure relates to the field of data processing, and more particularly, to techniques for automatically detecting anomalies in the content of a scheduled social media post, alerting a user to the presence of such anomalies before the content is posted, and recommending a course of action when an anomaly is detected.

BACKGROUND

Social networking, websites and other services allow individuals to interact with other people via the Internet and other electronic communication channels. For instance, social networking can be used by companies for marketing and customer service. Companies that utilize social networking often plan and schedule content to be posted to their social media properties well in advance of the publication date. The time window between post creation and publication (posting) can range from a few hours or days to a few weeks or more. During, this time window, external events that are relevant to the scheduled posts may occur unexpectedly and unpredictably. In many cases, the content author will wish to review the scheduled posts before they are published to ensure that the posts are appropriate in light of these external events. Therefore, there is a need for techniques for automatically flagging scheduled posts and bringing these events to the attention of the content author.

BRIEF DESCRIPTION OF THE DRAWINGS

The accompanying drawings are not intended to be drawn to scale. In the drawings, each identical or nearly identical component that is illustrated in various figures is represented by a like numeral.

DETAILED DESCRIPTION

Electronic content that has been created and scheduled for publication (e.g., via a website or social media channel) at a future date is referred to as a scheduled post. External events can occur during the period between creation and publication of the scheduled post. Depending on the nature of the external events, these events can have an effect, sometimes positive or negative, on the scheduled post. For example, a magazine publisher may schedule a post promoting an interview with a famous actor that will be published in an upcoming issue. A week before the content is scheduled to post, the actor receives a prestigious award for her humanitarian work in a developing country, which is reported by several online media outlets. In this situation, it may be desirable for the publisher to modify the post before scheduled publication to reflect this development and improve the timeliness and relevance of the content. In another example, a travel website may schedule a post advertising an upcoming cruise in the Mediterranean. Two days before the content is scheduled to post, a cruise ship in the Caribbean is forced to return to port after a fire occurs in the engine room, leading to a significant amount of negative public sentiment toward the cruise industry across various social media platforms. In this situation, it may be desirable for the travel website to postpone the post until a later time. However, there are no existing automated techniques for associating these events with the content of a scheduled post and alerting the author before the post is published. Instead, only manual and ad-hoc solutions exist. As such, authors of social media content must manually keep track of external events that are relevant to all scheduled posts, which can be very difficult, particularly where the content spans multiple topics, geographical locations and time periods. Furthermore, in some instances such authors may not ever become aware of some events before the post is published, which can result in a missed marketing opportunity or an undesirable response from the public, depending on the nature of the event, the content of the post, and the timing of the post with respect to the occurrence of the event.

To this end, and in accordance with an embodiment of the present invention, techniques are disclosed for automatically detecting anomalies in the content of a scheduled social media post, alerting, a user to the presence of such anomalies before the content is posted and recommending a course of action when an anomaly is detected. A set of keywords is extracted from a scheduled post using an ontological classification technique. At predetermined time intervals, the keywords are compared with information obtained from one or more data sources, such as social media platforms and web search engines, to determine if an anomaly is present. An anomaly is declared or detected or otherwise occurs when a deviation exceeds an algorithmically-derived threshold. The deviation may include, for example, the number of instances a keyword is mentioned in the data sources, the geo-location of the mentions, or any other parameter of interest. If an anomaly is detected, the scheduled post is classified into one of at least three categories: supporting the post, neutral, or opposing the post. The classification is based on whether the sentiment and emotion of the external mentions match those of the post. If the emotion and sentiment of the external mentions are similar to the emotion and sentiment of the post, the scheduled post is classified as supporting. Likewise, if the emotion and sentiment of the external mentions are opposite from the emotion and sentiment of the post, the scheduled post is classified as opposing. If the relation cannot be determined, the scheduled post is classified as neutral. Once the anomaly is detected and the scheduled post is classified, the author of the post is alerted to the anomaly along, with the categorization. Such alerts can be through email, push notifications in a mobile application, text messaging, and any other type of electronic communication channel. Subsequently, the author may reschedule the post to an earlier or later time, delete the post, or change the post. Numerous configurations and variations will be apparent in light of this disclosure.

The term "content," as used in this disclosure, generally refers to any type of information that a user can interact with electronically, including, for example, text, images, audio, video, and graphics. Content may be included in documents, data, applications, services, web pages, e-mail messages, and electronic files. Examples of such content include messages that are posted to a social networking website, messages that are sent from one user computing device to another via an instant messaging or e-mail service, and photographs that are displayed on a blog. Content can, in some cases, include metadata (i.e., data about data) that may not be directly accessible by a user, such as message routing information, timestamps, authentication credentials, browser cookies, etc. Content can include natural language text that corresponds more closely with a human language, such as English, than an artificial language, such as C++. Other examples will be apparent in light of the present disclosure.

The term "post," as used in this disclosure, generally refers to any type of content that is published electronically. Publication of a post may occur, for example, when the content is made accessible to one or more users via a website, electronic bulletin board, social media application, or other suitable application.

The term "anomaly," as used in this disclosure, generally refers to a condition in which a deviation, inconsistency or incongruity from an expected state occurs in a set of data, and in particular, a post. For example, the statement "the sun is shining here" is an anomaly when made between sunset and sunrise at a particular location. In another example, a news report today that a store has gone out of business is an anomaly if the store had previously announced a grand opening for next, week. In yet another example, a business announcement that earnings have increased 25% is an anomaly if the projected earnings were previously announced as 10%. Other such examples will be apparent in light of this disclosure.

Example System

Figure 1:
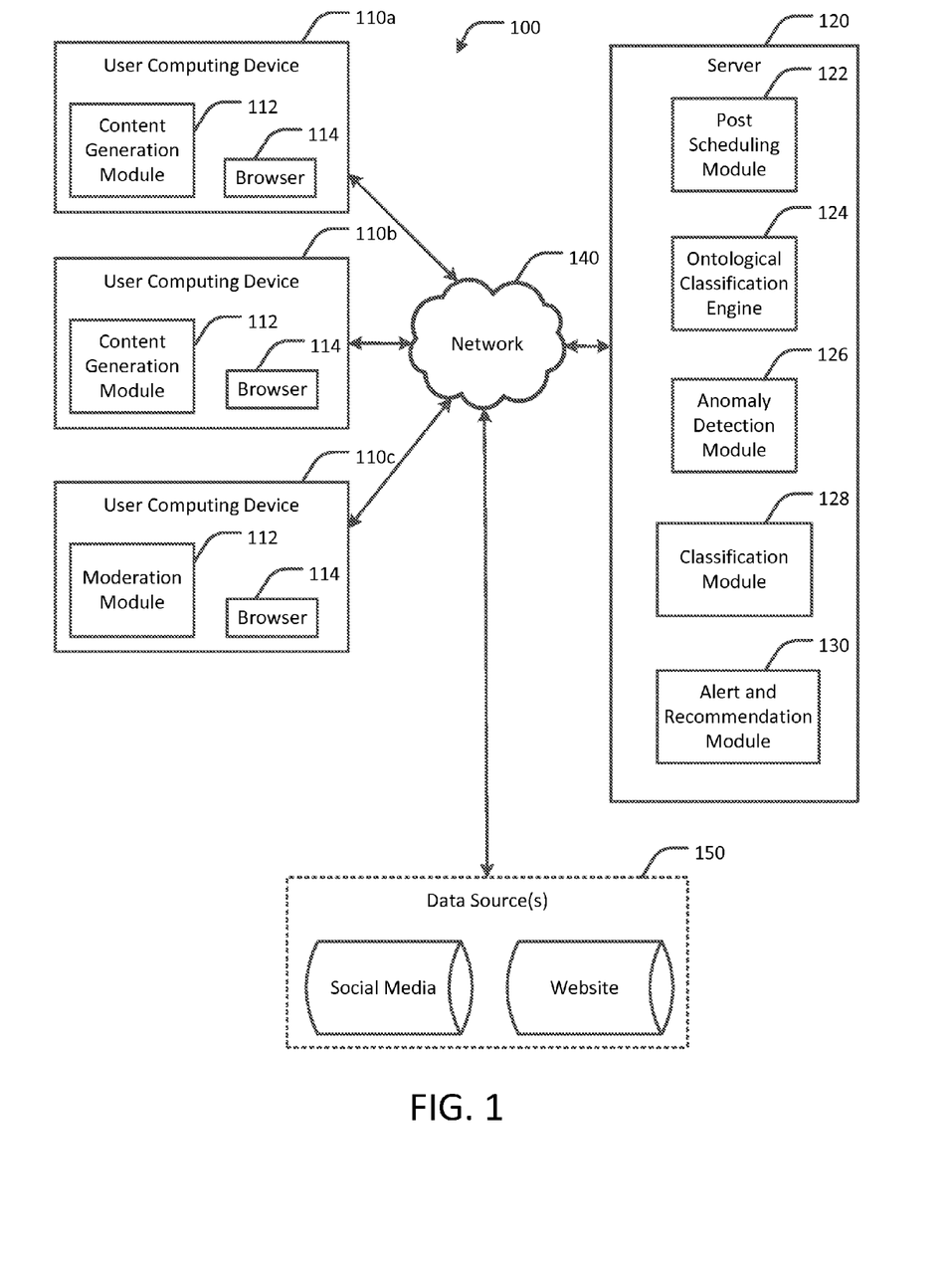
FIG. 1 illustrates an example client-server system for automatic anomaly alerts for scheduled posts, in accordance with an embodiment of the present invention.

FIG. 1 illustrates an example client-server system 100 for automatically detecting anomalies in the content of a scheduled social media post, alerting a user to the presence of such anomalies before the content is posted, and recommending a course of action when an anomaly is detected, in accordance with an embodiment. The system 100 includes one or more user computing devices 110a, 110b, 110c and a server 120, each electronically interconnected via a network 140 (e.g., a wide area network, such as the Internet, or a local area network). Generally, the computing devices 110a, 110b, 110c can be any type of device, such as a PC, tablet, or smart phone, configured to access and provide content (e.g., a web page, a word processing document, a fixed layout document, etc.) provisioned by the server 120 or another content-providing server. It will be understood that the functions of the computing devices variously described in this disclosure can be performed on and by any number of computing devices, depending on the particular application of the system. For instance, one or more of the computing devices 110a, 110b, 110c, the server 120, or any combination, of these can include a content generation module 112, a post scheduling module 122, an ontological classification engine 124, an anomaly detection module 126, a classification module 128, and an alert and recommendation module 130. The user computing devices idea, 110a, 110c can each include a browser 114 or other application suitable for retrieving, processing, displaying and interacting with the content. Data sources representing data that is external to the system 100 can include social media services (Facebook®, Twitter®, Google+®, Pinterest®, Instagram®, LinkedIn®, YouTube®, Foursquare®, etc.), websites (abcnews.com, cbc.ca, nytimes.com, bbc.co.uk, cnn.com, huffingtonpost.com, espn.go.com, etc.), blogs newsgroups, news feeds, or any other source of electronic data accessible via the network 140 or other suitable communication channel.

Figure 2:
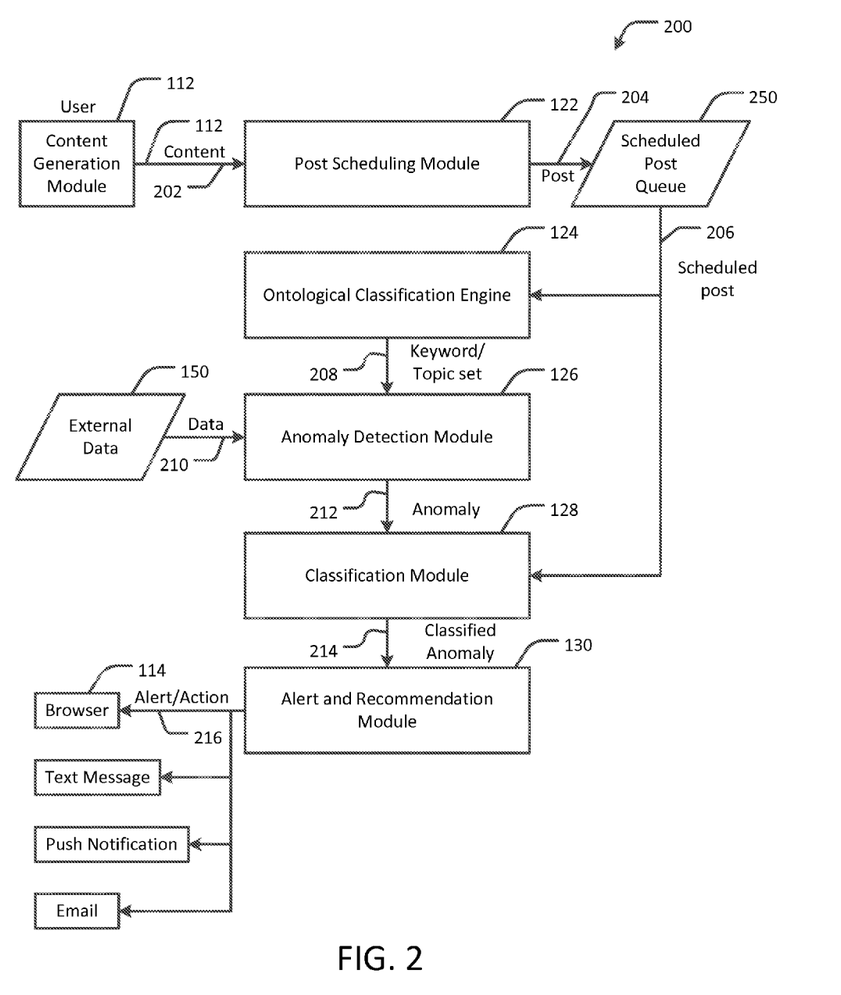
FIG. 2 is a data flow diagram representative of an example methodology for automatic anomaly alerts for scheduled posts, in accordance with an embodiment.

FIG. 2 is a data flow diagram 200 representative of an example methodology for automatically detecting anomalies in the content of a scheduled social media post, alerting a user to the presence of such anomalies before the content is posted, and recommending a course of action when an anomaly is detected, in accordance with an embodiment. Such a methodology can be implemented in conjunction with the system 100 of FIG. 1. In use, the content generation module 112 can be configured to receive content generated by a user, such as a post. For instance, a user can use the content generation module 112 (e.g., via the browser 114) to generate content 202 that is provided to the post scheduling module 122. The post scheduling module 122 schedules a time in the future at which the user-generated content 202 is to be published, and stores the scheduled post 204 in a scheduled post queue 250. The scheduled post 204 includes information about the time the post is scheduled to be published as well as the content of the post and any other tags, information or meta-data the user provides to associate the post with a particular topic or subject matter.

In an embodiment, the ontological classification engine 124 extracts key topics, concepts and keywords from the scheduled post 206 using any suitable ontological classification algorithm. For example, the ontological classification, engine 124 may be rule-based, and may be further adapted for a particular class of topics (e.g., topics relating to certain types of pop culture, politics, science, music, industry, etc.). The ontological classification engine 124 seeks to generate (e.g., using a corresponding set of rules) keywords, key phrases and topics 208 that are semantically or logically relevant to the context of the scheduled post 206 by extracting terms from all or portions of the content and, in some cases, using other vocabulary obtained from prior training or curation of the engine. For example, if the scheduled post 206 includes the phrase "Japanese airline safety case study will be presented by university researchers," the ontological classification engine 124 may generate keywords and topics 208 such as "airline safety," "Japanese airline," "commercial aviation," "academic research," and so forth. The ontological classification engine 124 may, in some instances, also use the user-provided tags as a seed input to the classification algorithm for algorithms that accept such seeds. The keywords and topics 208 can be grouped as a set specifically associated with the scheduled post 206. Other scheduled posts can be associated with different groups of keywords and topics.

In accordance with an embodiment of the present invention, the anomaly detection module 126 receives data 210 from an external data source 150, such as described with respect to FIG. 1. The data 210 may include any type of information, such as social media posts, news articles, press releases, opinion pieces, advertisements, electronic books, academic papers, government reports, and so forth. The anomaly detection module 126 continuously or periodically receives and processes the data 210, which may change over time as new external information is generated in response to various events. In some embodiments, the age, or time period, of the data 210 processed by the anomaly detection module 126 is configurable. For example, the anomaly detection module 126 may be configured to process external data 210 created prior to creation of the content 202 (e.g., news reports from one day, one week, two weeks, etc., prior to creation of the post). This enables the anomaly detection module 126 to reach back in time to process information that existed before the user created the post, if desired. Alternatively, the anomaly detection module 126 may be configured to process only external data created after the content 202 was created or during a fixed time period prior to the scheduled publication of the post.

For a given set of keywords and topics 208 associated with the scheduled post 206, the anomaly detection module 126 computes a deviation based on the data 210 at one or more intervals of time (e.g., every 15 or 30 minutes, every 1, 3, 6, 12, 24 hours, etc.) using an anomaly detection algorithm. Examples of such anomaly detection algorithms include neural networks, Bayesian networks, support vector machines, rule-based algorithms. In one embodiment, the anomaly detection module 126 computes the deviation by extracting keywords from the data 210 using the same algorithm used to extract keywords for scheduled post. These extracted keywords can be termed as feature vectors. One-to-one mapping can then be done for feature vectors to determine how many feature vectors for scheduled post matches that of data 210. If the match meets a threshold then it is an anomaly. The time intervals can be user-specified or automatically determined based on the frequency or amount of new data 210 (e.g., data not already processed) received over some period of time. If the deviation exceeds a predetermined threshold value, an anomaly 212 is generated; otherwise, no anomaly is generated. The deviation can be based on any number of factors, such as the number of times any of the keywords is mentioned in the data 210, the geo-location of the mentions or any other parameter of interest. For example, the anomaly 212 may be generated if one of the keywords 208 is mentioned in the data 210 more than 100 times at locations within the United States.

In an embodiment, the classification module 128 classifies the anomaly 212 into one of at least three categories: supporting, the post, neutral, or opposing the post. The classification is based on the emotion and sentiment of all the mentions around the set of keywords and topics 208 associated with the scheduled post 206. Any sentiment engine can be used. The sentiments can be based on mentions, where the mentions can include the entire article, a keyword, comments received by the article, references to the article, or any other content that refers to the keywords and topics 208. If the emotion and sentiment of the mentions are similar to the emotion and sentiment of the scheduled post 206, the anomaly 212 is classified as supporting the post. If the emotion and sentiment of the mentions are opposite the emotion and sentiment of the scheduled post 206, the anomaly 212 is classified as opposing the post. If the relation cannot be determined, the anomaly 212 is classified as neutral. Further analysis is also possible. For example, the keywords that resulted in the anomaly being classified as opposing or supporting the post can be highlighted so that the user can focus on such opposing keywords. The result of the classification is a classified anomaly 214. Once an anomaly 212 is detected and classified, the user is alerted to the classified anomaly 214 by the alert and recommendation module 130 via an alert or action 216 sent to the browser 114 or other suitable user interface, such as email, push notifications in a mobile application, or text messaging. In response to the alert 216, the user can then take one of the following actions: delay the scheduled post 206 and change its scheduled time in the scheduled post queue 205 to another time in the future; pull in the scheduled post 206 and change its scheduled time in the scheduled post queue 250 to another time in the future; or suspend the scheduled post 206 and remove it from the scheduled post queue 250. In some cases, the alert and recommendation module 130 can suggest to the user which of these actions to take based on the classification, and the user can accept the recommended action or perform a different action at the user's discretion. For example, if the classified anomaly 214 is supporting, then the recommended action may include pulling in the scheduled post 206 to an earlier scheduled time. In another example, if the classified anomaly 214 is opposing, then the recommended action may include delaying the scheduled post 206 to a later scheduled time.

Example User Interface

Figure 3:
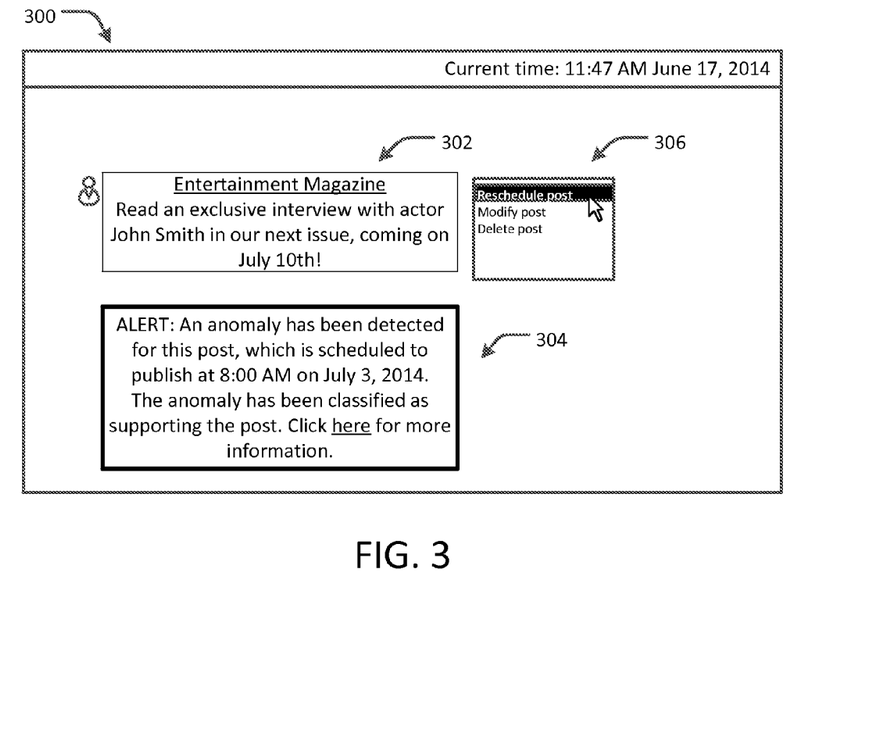
FIG. 3 illustrates an example graphical user interfaces for a webpage, in accordance an embodiment of the present invention.

FIG. 3 is an example graphical user interface 300 configured for use in conjunction with the system 100 of FIG. 1, in accordance with an embodiment. The interface 300 may, for example, be implemented in the browser 114. The interface 300 is configured to display a scheduled post 302, and alert 304, and a recommended action 306. The user can read the scheduled post 302 and the alert 304, and determine whether to take one of the recommended actions 306 using, for example, a mouse to select the desired action. In some cases, the alert 304 can contain a hyperlink that, when selected by the user, provides the user with more information about the external data that was used to generate the anomaly (e.g., the news article, social media message, etc.).

Example Methodologies

Figure 4:
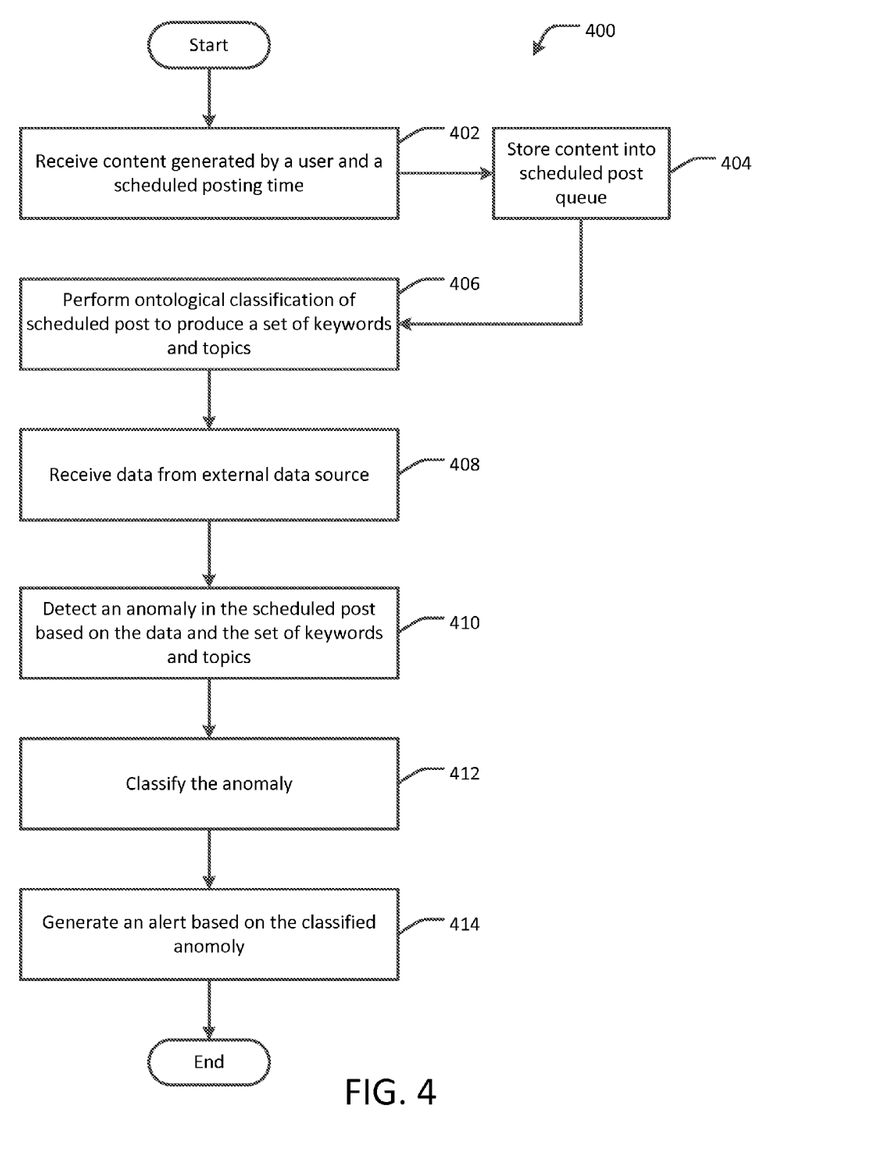
FIG. 4 is a flow diagram of an example methodology for automatic anomaly alerts for scheduled posts, in accordance with an embodiment of the present invention.

FIG. 4 is a flow diagram of an example methodology 400 for automatically detecting anomalies in the content of a scheduled social media post, alerting a user to the presence of such anomalies before the content is posted, and recommending a course of action when an anomaly is detected. The example methodology 400 may, for example, be implemented in the server 120 of FIG. 1. The method 400 begins by receiving 402 content generated by a user and a scheduled posting time associated with the content. The method 400 continues by storing 404 the content into a scheduled post queue as a scheduled post. Unless the scheduled post is modified or deleted, the content will automatically be published at or around the scheduled posting, time without further user intervention. The method 400 continues by performing 406 an ontological classification of the scheduled post to produce a set of keywords and topics associated with the scheduled post. As discussed with respect to FIG. 2, any suitable ontological classification algorithm can be used, including but not limited to neural networks, Bayesian networks, support vector machines, and other rule-based algorithms. The method 400 continues by receiving 408 data from an external data source. For example, a listening engine may search for and process publicly available information on the Internet (e.g., newsfeeds social media postings, text messages, and so forth). Using the external data and the set of keywords and topics, the method 400 continues by detecting 410 an anomaly in the scheduled post. The anomaly can be any deviation, inconsistency or incongruity between the set of keywords and topics associated with the scheduled post and the external data. If an anomaly is detected, the method 400 continues by classifying 412 the anomaly into one of three classes: supporting the post, neutral, or opposing the post. The classification can be based on the emotion and sentiment of the external data (e.g., positive, negative, powerful, weak, offensive, defensive, supportive, critical, pleased, displeased, aggressive, timid, and so forth). Finally, the method 400 continues by generating 414 an alert based on the classified anomaly. The alert is configured to be presented to the user via a graphical user interface, such as provided by a web browser or other suitable application.

Example Computing Device

Figure 5:
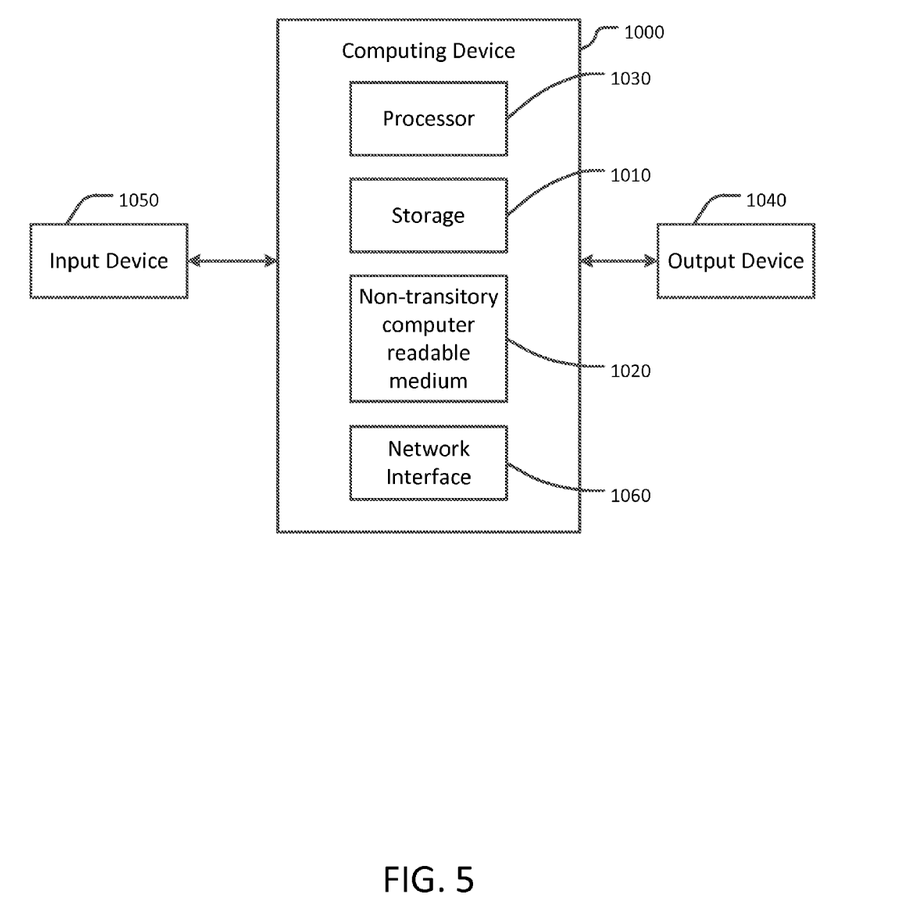
FIG. 5 is a block diagram representing an example computing device that may be used in accordance with an embodiment of the present invention.

FIG. 5 is a block diagram representing an example computing device 1000 that may be used to perform any of the techniques as variously described herein. For example, the user computing devices 110*a*, 110*b*, 110*c*, the server 120, or any combination of these (such as described with respect to FIG. 1) may be implemented in the computing device 1000. The computing, device 1000 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described herein. A distributed computational system may be provided comprising a plurality of such computing devices.

The computing device 1000 includes one or more storage devices 1010 and/or non-transitory computer-readable media 1020 having encoded thereon one or more computer-executable instructions or software for implementing techniques as variously described herein. The storage devices 1010 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught herein. The storage device 1010 may include other types of memory as well, or combinations thereof. The storage device 1010 may be provided on the computing device 1000 or provided separately or remotely from the computing device 1000. The non-transitory computer-readable media. 1020 may include, but are not limited to, one or more types of hardware memory, non-transitory tangible media (for example, one or more magnetic storage disks, one or more optical disks, one or more USB flash drives), and the like. The non-transitory computer-readable media 1020 included in the computing device 1000 may store computer-readable and computer-executable instructions or software for implementing various embodiments. The computer-readable media 1020 may be provided on the computing device 1000 or provided separately or remotely from the computing device 1000.

The computing device 1000 also includes at least one processor 1030 for executing computer-readable and computer-executable instructions or software stored in the storage device 1010 and/or non-transitory computer-readable media 1020 and other programs for controlling system hardware. Virtualization may be employed in the computing device 1000 so that infrastructure and resources in the computing device 1000 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1000 through an output device 1040, such as a screen or monitor, which may display one or more user interfaces provided in accordance with some embodiments. The output device 1040 may also display other aspects, elements and/or information or data associated with some embodiments. The computing device 1000 may include other I/O devices 1050 for receiving input from a user, for example, a keyboard, a joystick, a game controller, a pointing device (e.g., a mouse, a user's finger interfacing, directly with a display device, etc.), or any suitable user interface. The computing device 1000 may include other suitable conventional I/O peripherals. The computing device 1000 can include and/or be operatively coupled to various suitable devices for performing one or more of the functions as variously described herein. For instance, the computing device may include a network interface 1060 for communicating with other devices via a network, such as the Internet.

The computing device 1000 may run any operating system, such as any of the versions of Microsoft® Windows® operating systems, the different releases of the Unix and Linux operating systems, any version of the MacOS® for Macintosh computers, any embedded operating system, any real-time operating, system, any open source operating system, any proprietary operating system, any operating systems for mobile computing devices, or any other operating system capable of running on the computing device 1000 and performing the operations described herein. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described herein. In a more general sense, any suitable combination of hardware, software, and firmware can be used, as will be apparent.

As will be appreciated in light of this disclosure, the various modules and components of the system shown in FIG. 1, such as the content generation module 112, the post scheduling module 122, the ontological classification engine 124, the anomaly detection module 126, the classification module 128, and the alert and recommendation module 130, can be implemented in software, such as a set of instructions (e.g., C, C++, object-oriented JavaScript, Java, BASIC, etc.) encoded on any computer readable medium or computer program product (e.g., hard drive, server, disc, or other suitable non-transient memory or set of memories), that when executed by one or more processors, cause the various methodologies provided herein to be carried out it will be appreciated that, in some embodiments, various functions performed by the user computing system, as described herein, can be performed by similar processors and/or databases in different configurations and arrangements, and that the depicted embodiments are not intended to be limiting. Various components of this example embodiment, including the user computing device 110*a*, 110*b*, 110*c* and the server 120 can be integrated into, for example, one or more desktop or laptop computers, workstations, tablets, smartphones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described herein can be combined in any number of configurations. One example embodiment provides a system including a storage having at least one memory, and one or more processors each operatively coupled to the storage. The one or more processors are configured to carry out a process including receiving electronic content generated by a user and a scheduled posting time associated with the content; identifying one or more keywords or topics associated with the scheduled post, or a combination of keywords and topics; receiving data from an external data source; detecting an anomaly in the scheduled post based on the data and the keywords and topics; classifying the anomaly mm one of a supporting anomaly, an opposing anomaly, and a neutral anomaly; and generating an alert based on the classified anomaly The alert may be configured to be presented to the user via a graphical user interface. In some cases, the process includes storing the electronic content into a scheduled post queue as a scheduled post to publish at the scheduled posting, time. In some cases, the process includes receiving a user request to reschedule the scheduled post at a different scheduled posting time, and, in response thereto, changing the scheduled post to publish at the different scheduled posting time. In some cases, the process includes receiving a user request to modify the scheduled post with modified electronic content, and, in response thereto, modifying the scheduled post to include the modified electronic content. In some cases, the process includes receiving a user request to delete the scheduled post, and, in response thereto, deleting the scheduled post from the scheduled post queue. In some cases, the process includes generating a recommended action based on the classification of the anomaly the recommended action configured to be presented to the user via the graphical user interface. In some such cases, the recommended action is reschedule the scheduled post, modify the scheduled post, or delete the scheduled post. In some cases, the alert is generated prior to the scheduled posting, time. Another embodiment provides a non-transient computer-readable medium or computer program product having, instructions encoded thereon that when executed by one or more processors cause the processor to perform one or more of the functions defined in the present disclosure, such as the methodologies variously described in this paragraph. As previously discussed, in some cases, some or all of the functions variously described in this paragraph can be performed in any order and at any time by one or more different processors.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method comprising:
   receiving, by a processor and via a user interface, electronic content generated by a user and a scheduled posting time associated with the content;
   storing, by the processor, the electronic content into a scheduled post queue as a scheduled post to publish at the scheduled posting time;
   identifying, by the processor, at least one of a keyword and topic associated with the scheduled post;
   receiving, by the processor, data from an external data source excluding the electronic content generated by the user;
   detecting, by the processor, an anomaly in the scheduled post based on the data from the external source and the keyword or topic, the anomaly representing at least one of a deviation, inconsistency, and incongruity between the at least one keyword and topic associated with the scheduled post and the data from the external data source, wherein the anomaly is detected when a number of instances that the at least one keyword and topic deviates from the scheduled post exceeds a predetermined threshold;
   classifying, by the processor, the anomaly into one of a supporting anomaly, an opposing anomaly, and a neutral anomaly based on additional information about the keyword or topic derived from the external data source;
   generating, by the processor, an alert based on the classified anomaly, the alert including a hyperlink to the external data source, the hyperlink when selected causes the user interface to display the additional information about the keyword or topic associated with the scheduled post; and
   causing, by the processor, the user interface to display the scheduled post and the alert including the hyperlink prior to publication of the scheduled post at the scheduled posting time.

2. The method of claim 1, wherein the identifying includes performing, by the processor, an ontological classification of the scheduled post to identify the at least one keyword and topic.

3. The method of claim 1, further comprising receiving a user request to reschedule the scheduled post at a different scheduled posting time, and, in response thereto, changing, by the processor, the scheduled post to publish at the different scheduled posting time.

4. The method of claim 1, further comprising receiving a user request to modify the scheduled post with modified electronic content, and, in response thereto, modifying, by the processor, the scheduled post to include the modified electronic content.

5. The method of claim 1, further comprising receiving a user request to delete the scheduled post, and, in response thereto, deleting, by the processor, the scheduled post from the scheduled post queue.

6. The method of claim 1, further comprising generating, by the processor, a recommended action based on the classification of the anomaly, the recommended action configured to be presented to the user via the graphical user interface.

7. The method of claim 6, wherein the recommended action is one of reschedule the scheduled post, modify the scheduled post, and delete the scheduled post.

8. A system comprising:
   a storage; and
   a processor operatively coupled to the storage and configured to execute instruction stored in the storage that when executed cause the processor to carry out a process comprising:
   receiving, via a user interface, electronic content generated by a user and a scheduled posting time associated with the content;
   storing the electronic content into a scheduled post queue as a scheduled post to publish at the scheduled posting time;
   performing an ontological classification of the scheduled post to produce a set of keywords and topics associated with the scheduled post;
   receiving data from an external data source excluding the electronic content generated by the user;
   detecting an anomaly in the scheduled post based on the data from the external source and the set of keywords and topics, the anomaly representing at least one of a deviation, inconsistency, and incongruity between the at least one keyword and topic associated with the scheduled post and the data from the external data source, wherein the anomaly is detected when a number of instances that the at least one keyword and topic deviates from the scheduled post exceeds a predetermined threshold;

classifying the anomaly into one of a supporting anomaly, an opposing anomaly, and a neutral anomaly based on additional information about the keyword or topic derived from the external data source;

generating an alert based on the classified anomaly, the alert including a hyperlink to the external data source, the hyperlink when selected causes the user interface to display the additional information about the keyword or topic associated with the scheduled post; and causing the user interface to display the scheduled post and the alert including the hyperlink prior to publication of the scheduled post at the scheduled posting time.

9. The system of claim 8, wherein the process includes receiving a user request to reschedule the scheduled post at a different scheduled posting time, and, in response thereto, changing the scheduled post to publish at the different scheduled posting time.

10. The system of claim 8, wherein the process includes receiving a user request to modify the scheduled post with modified electronic content, and, in response thereto, modifying the scheduled post to include the modified electronic content.

11. The system of claim 8, wherein the process includes receiving a user request to delete the scheduled post, and, in response thereto, deleting the scheduled post from the scheduled post queue.

12. The system of claim 8, wherein the process includes generating a recommended action based on the classification of the anomaly, the recommended action configured to be presented to the user via the graphical user interface.

13. The system of claim 12, wherein the recommended action is one of reschedule the scheduled post, modify the scheduled post, and delete the scheduled post.

14. The system of claim 8, wherein the alert is generated prior to the scheduled posting time.

15. A non-transitory computer readable medium having instructions encoded thereon that when executed by one or more processors cause a process to be carried out, the process comprising:

receiving, via a user interface, electronic content generated by a user and a scheduled posting time associated with the content;

storing the electronic content into a scheduled post queue as a scheduled post to publish at the scheduled posting time;

identifying at least one of a keyword and topic associated with the scheduled post;

receiving data from an external data source excluding the electronic content generated by the user;

detecting an anomaly in the scheduled post based on the data from the external source and the keyword or topic, the anomaly representing at least one of a deviation, inconsistency, and incongruity between the at least one keyword and topic associated with the scheduled post and the data from the external data source, wherein the anomaly is detected when a number of instances that the at least one keyword and topic deviates from the scheduled post exceeds a predetermined threshold;

classifying the anomaly into one of a supporting anomaly, an opposing anomaly, and a neutral anomaly based on additional information about the keyword or topic derived from the external data source;

generating an alert based on the classified anomaly, the alert including a hyperlink to the external data source, the hyperlink when selected causes the user interface to display the additional information about the keyword or topic associated with the scheduled post; and causing the user interface to display the scheduled post and the alert including the hyperlink prior to publication of the scheduled post at the scheduled posting time.

16. The non-transitory computer readable medium of claim 15, wherein the process includes receiving a user request to reschedule the scheduled post at a different scheduled posting time, and, in response thereto, changing the scheduled post to publish at the different scheduled posting time.

17. The non-transitory computer readable medium of claim 15, wherein the process includes receiving a user request to modify the scheduled post with modified electronic content, and, in response thereto, modifying the scheduled post to include the modified electronic content.

18. The non-transitory computer readable medium of claim 15, wherein the process includes receiving a user request to delete the scheduled post, and, in response thereto, deleting the scheduled post from the scheduled post queue.

19. The non-transitory computer readable medium of claim 15, wherein the process includes generating a recommended action based on the classification of the anomaly, the recommended action configured to be presented to the user via the graphical user interface, wherein the recommended action is one of reschedule the scheduled post, modify the scheduled post, and delete the scheduled post.

20. The non-transitory computer readable medium of claim 15, wherein the alert is generated prior to the scheduled posting time.

* * * * *